(12) United States Patent
Le et al.

(10) Patent No.: US 11,514,932 B1
(45) Date of Patent: Nov. 29, 2022

(54) SOFT BIAS SHAPE ANISOTROPY STABILIZATION READ HEAD DESIGN AND METHOD OF MAKING SAME

(71) Applicant: Western Digital Technologies, Inc., San Jose, CA (US)

(72) Inventors: Quang Le, San Jose, CA (US);
Hongquan Jiang, San Jose, CA (US);
Hisashi Takano, San Jose, CA (US);
Cherngye Hwang, San Jose, CA (US);
Xiaoyong Liu, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/359,098

(22) Filed: Jun. 25, 2021

(51) Int. Cl.
  *G11B 5/39* (2006.01)
  *G11B 5/11* (2006.01)
  *G11B 5/31* (2006.01)

(52) U.S. Cl.
  CPC ............. *G11B 5/3932* (2013.01); *G11B 5/11* (2013.01); *G11B 5/3912* (2013.01); *G11B 5/3948* (2013.01); *G11B 5/3958* (2013.01); *G11B 5/31* (2013.01)

(58) Field of Classification Search
  None
  See application file for complete search history.

(56) References Cited

U.S. PATENT DOCUMENTS

| 5,436,778 A | 7/1995 | Lin et al. |
| 5,530,608 A | 6/1996 | Aboaf et al. |
| 5,574,605 A | 11/1996 | Baumgart et al. |
| 5,656,485 A | 8/1997 | Jacobson et al. |
| 5,923,505 A | 7/1999 | Kroes et al. |

(Continued)

FOREIGN PATENT DOCUMENTS

| EP | 2026337 B1 | 12/2010 |
| JP | H06259730 A | 9/1994 |

(Continued)

OTHER PUBLICATIONS

Dovek, M. M. et al., "Microtrack Profiling Technique for Narrow Track Tape Heads", IEEE Transactions on Magnetics, vol. 28, No. 5, Sep. 1992, pp. 2304-2306.

(Continued)

*Primary Examiner* — Craig A. Renner
(74) *Attorney, Agent, or Firm* — Patterson & Sheridan, LLP; Steven H. VerSteeg

(57) ABSTRACT

The present disclosure generally relates to magnetic storage devices, such as magnetic tape drives, comprising a read head. The read head comprises a plurality of read sensors disposed between a lower shield having a first width in a stripe height direction and an upper shield. The plurality of read sensors comprise an antiferromagnetic layer and a free layer comprising a first layer and a second layer. A plurality of soft bias side shields disposed adjacent to and outwardly of the plurality of read sensors in a cross-track direction, each of the plurality of soft bias side shields having a second width in the stripe height direction less than the first width. Each of the plurality of soft bias side shields are spaced a first distance from the lower shield and a second distance from the upper shield, the first distance being substantially equal to the second distance.

19 Claims, 9 Drawing Sheets

(56) References Cited

U.S. PATENT DOCUMENTS

| | | |
|---|---|---|
| 5,962,153 A | 10/1999 | Kirino et al. |
| 5,963,401 A | 10/1999 | Dee et al. |
| 5,995,338 A | 11/1999 | Watanabe et al. |
| 5,998,048 A | 12/1999 | Jin et al. |
| 6,038,106 A | 3/2000 | Aboaf et al. |
| 6,185,077 B1 | 2/2001 | Tong et al. |
| 7,038,892 B2 | 5/2006 | Chau et al. |
| 7,199,975 B1 | 4/2007 | Pan |
| 7,986,485 B2 | 7/2011 | Mckinstry et al. |
| 8,576,518 B1 | 11/2013 | Zeltser et al. |
| 9,230,576 B1 * | 1/2016 | Gill et al. ............ G11B 5/3932 |
| 9,269,383 B1 | 2/2016 | Hattori et al. |
| 9,747,931 B1 | 8/2017 | Biskebom et al. |
| 9,947,344 B2 | 4/2018 | Biskebom et al. |
| 10,580,442 B2 | 3/2020 | Biskebom et al. |
| 2003/0179509 A1 | 9/2003 | Pinarbasi |
| 2005/0195535 A1 | 9/2005 | Shi et al. |
| 2009/0086380 A1 * | 4/2009 | Seagle ................ G11B 5/3912 360/319 |
| 2010/0328799 A1 | 12/2010 | Braganca et al. |
| 2011/0007431 A1 | 1/2011 | Braganca et al. |
| 2011/0069413 A1 | 3/2011 | Maat et al. |
| 2011/0141629 A1 | 6/2011 | Braganca et al. |
| 2013/0286511 A1 | 10/2013 | Edelman et al. |
| 2014/0055884 A1 | 2/2014 | Edelman et al. |
| 2014/0177102 A1 | 6/2014 | Kief et al. |
| 2014/0218823 A1 | 8/2014 | McKinlay et al. |
| 2015/0199990 A1 | 7/2015 | Braganca et al. |
| 2015/0221329 A1 | 8/2015 | Mashima et al. |
| 2015/0243301 A1 | 8/2015 | Kief et al. |
| 2015/0325260 A1 | 11/2015 | Singleton et al. |
| 2017/0154641 A1 | 6/2017 | Hao et al. |
| 2021/0158840 A1 | 5/2021 | Seagle et al. |

FOREIGN PATENT DOCUMENTS

| | | |
|---|---|---|
| JP | H07262525 A | 10/1995 |
| JP | 2002289946 A | 10/2002 |

OTHER PUBLICATIONS

Cannon, D. M. et al., "Design and performance of a magnetic head for a high-density tape drive", IBM J. Res. Develop., vol. 30, No. 3, May 1986, pp. 270-277.

Nakashio E. et al., "Flux Guide Type Tunnel-Valve Head for Tape Storage Applications", IEEE Transactions on Magnetics, vol. 38, No. 5, Sep. 2002, pp. 1925-1927.

Biskebom, Robert G. et al., "TMR tape drive for a 15 TB cartridge", AIP Publishing, Dec. 2017, https://aip.scitation.org/doi/10.1063/1.5007788, Last accessed Jun. 22, 2021.

\* cited by examiner

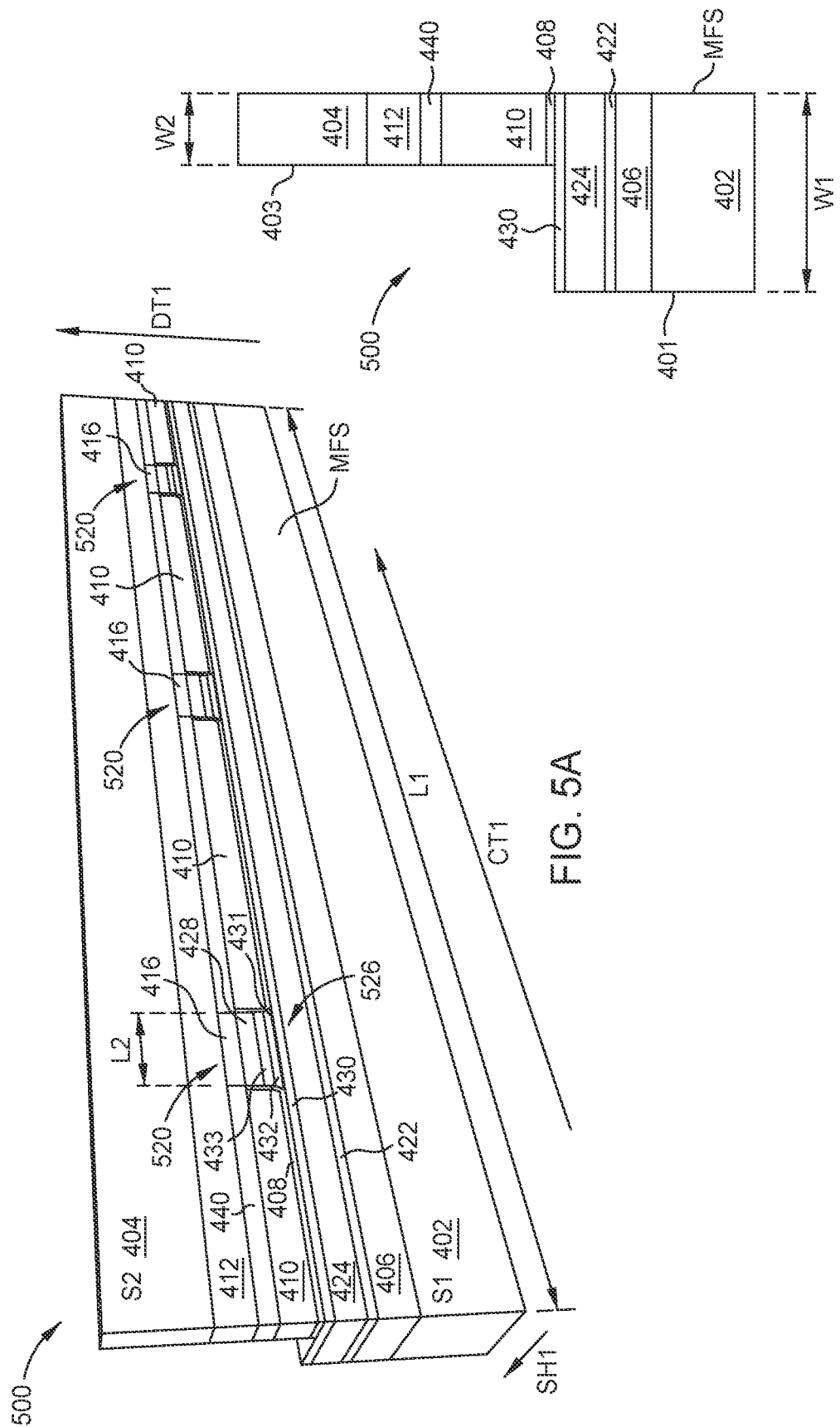

SOFT BIAS SHAPE ANISOTROPY STABILIZATION READ HEAD DESIGN AND METHOD OF MAKING SAME

BACKGROUND OF THE DISCLOSURE

Field of the Disclosure

Embodiments of the present disclosure generally relates to magnetic storage devices, such as magnetic tape drives, comprising a read head, and methods of forming thereof.

Description of the Related Art

Tape data storage is a system for storing digital information on magnetic tape using digital recording. Tape storage media is more commonly packaged in cartridges and cassettes. A tape drive performs writing or reading of data in the cartridges or cassettes. A common cassette-based format is LTO, which comes in a variety of densities.

Tape drives operate by using a tape head to record and read back information from tapes by magnetic processes. The tape head can have servo elements and data elements that are arranged in an array that is oftentimes referred to as a tape head array.

Hard bias elements adjacent sensors in tape drives can involve a high coercivity, which can hinder device performance. Soft bias elements involve a lower coercivity but is unstable and can even move during operation of the tape drive. Soft bias elements can also involve signal shunting, hindering device performance.

Therefore, there is a need in the art for tape drives having soft bias elements that facilitate low coercivity, stability of the soft bias elements, reduced signal shunting, and enhanced device performance.

SUMMARY OF THE DISCLOSURE

The present disclosure generally relates to magnetic storage devices, such as magnetic tape drives, comprising a read head. The read head comprises a plurality of read sensors disposed between a lower shield having a first width in a stripe height direction and an upper shield. The plurality of read sensors comprise an antiferromagnetic layer and a free layer comprising a first layer and a second layer. A plurality of soft bias side shields disposed adjacent to and outwardly of the plurality of read sensors in a cross-track direction, each of the plurality of soft bias side shields having a second width in the stripe height direction less than the first width. Each of the plurality of soft bias side shields are spaced a first distance from the lower shield and a second distance from the upper shield, the first distance being substantially equal to the second distance.

In one embodiment, a read head comprises a lower shield having a first width in a stripe height direction, an upper shield, a lower lead disposed over the lower shield, one or more upper leads disposed between the lower lead and the upper shield along a down-track direction, and a plurality of read sensors disposed between the lower lead and the one or more upper leads at a media facing surface, each read sensor of the plurality of read sensors comprising a multilayer structure, the multilayer structure comprising: an antiferromagnetic (AFM) layer and a free layer. The read head further comprises a plurality of soft bias side shields disposed between and outwardly of the plurality of read sensors, each of the plurality of soft bias side shields having a second width in the stripe height direction less than the first width.

In another embodiment, a read head comprises a lower shield having a first width in a stripe height direction and a first length in a cross-track direction, a lower lead disposed over the lower shield, an AFM layer disposed over the lower lead, the AFM layer having a second length in the cross-track direction substantially equal to the first length, and a plurality of read sensors disposed over the AFM layer at a media facing surface (MFS), each read sensor of the plurality of read sensors comprising a multilayer structure, the multilayer structure comprising: a portion of the AFM layer and a free layer comprising a first layer and a second layer. The read head further comprises a plurality of soft bias side shields disposed between and outwardly of the plurality of read sensors, each of the plurality of soft bias side shields having a second width in the stripe height direction less than the first width, one or more upper leads disposed over the plurality of read sensors, and an upper shield disposed over the one or more upper leads.

In yet another embodiment, a read head comprises a lower shield having a first width in a stripe height direction, an upper shield, a lower lead disposed over the lower shield, one or more upper leads disposed between the lower lead and the upper shield along a down-track direction, and a plurality of read sensors disposed between the lower lead and the one or more upper leads at a media facing surface, each read sensor of the plurality of read sensors comprising a multilayer structure, the multilayer structure comprising: a buffer layer, an antiferromagnetic (AFM) layer, and a free layer comprising a first layer and a second layer. The read head further comprises a plurality of soft bias side shields disposed between and outwardly of the plurality of read sensors, each of the plurality of soft bias side shields having a second width in the stripe height direction less than the first width. Each of the plurality of soft bias side shields are spaced a first distance from the lower shield and a second distance from the upper shield, the first distance being substantially equal to the second distance.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 5A-5B illustrate schematic views of a read head, according to another implementation.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to magnetic storage devices, such as magnetic tape drives, comprising a read head. The read head comprises a plurality of read sensors disposed between a lower shield having a first width in a stripe height direction and an upper shield. The plurality of read sensors comprise an antiferromagnetic layer and a free layer comprising a first layer and a second layer. A plurality of soft bias side shields disposed adjacent to and outwardly of the plurality of read sensors in a cross-track direction, each of the plurality of soft bias side shields having a second width in the stripe height direction less than the first width. Each of the plurality of soft bias side shields are spaced a first distance from the lower shield and a second distance from the upper shield, the first distance being substantially equal to the second distance.

Figure 1:
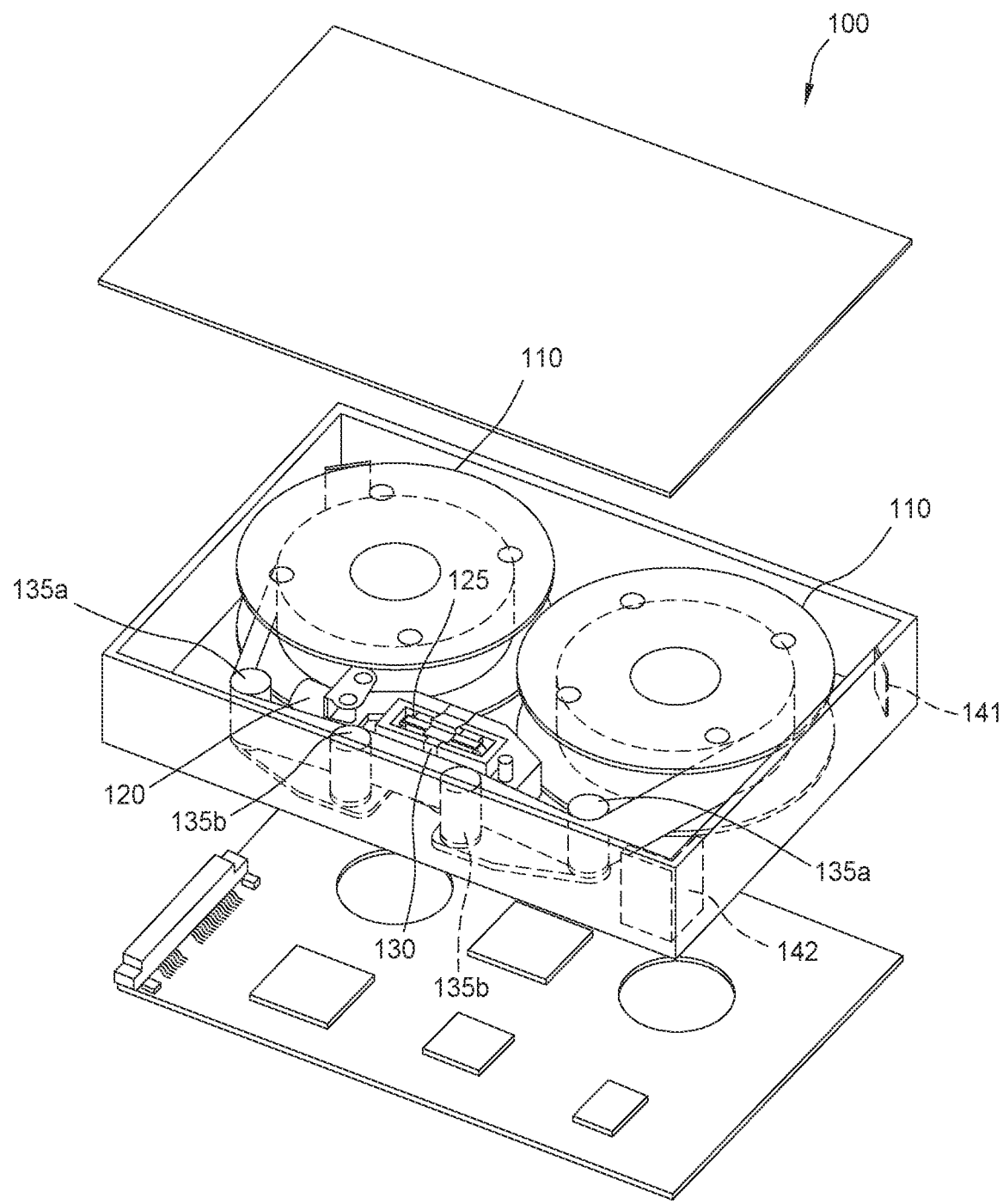
FIG. 1 is a schematic perspective exploded view of a storage device, according to one implementation.

FIG. 1 is a schematic perspective exploded view of a storage device 100, according to one implementation. The storage device 100 is a magnetic media drive. The storage device 100 will be referred to as the tape drive 100 hereafter. It is noted that while the tape drive is shown as having embedded tape for illustrative purposes, the embodiments of the invention can be applied in various forms of tape drive including a drive where the tape media is insertable such as in a media cartridge. One example is tape drives and media conforming to the LTO standard, and the various drive illustrations shown would be similar to such a drive when the media is fully inserted and engageable for data access.

Figure 2:
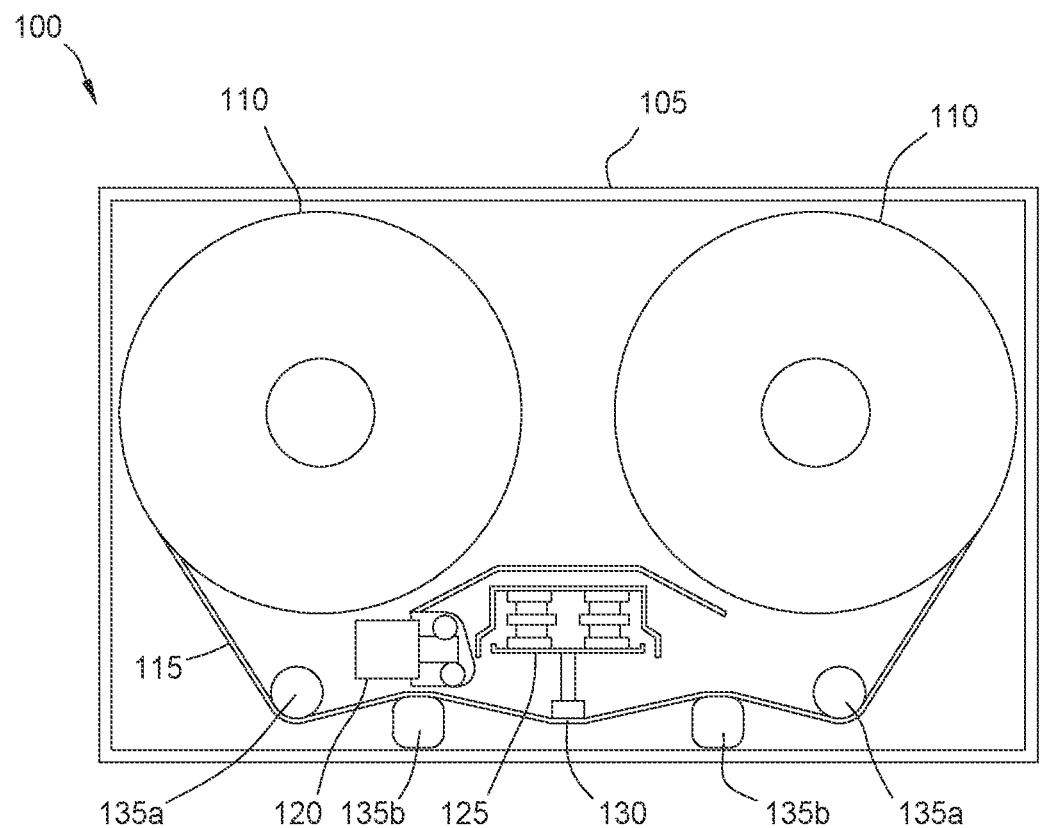
FIG. 2 is a schematic top-down view of the tape drive illustrated in FIG. 1, according to one implementation.

FIG. 2 is a schematic top-down view of the tape drive 100 illustrated in FIG. 1, according to one implementation.

Figure 3:
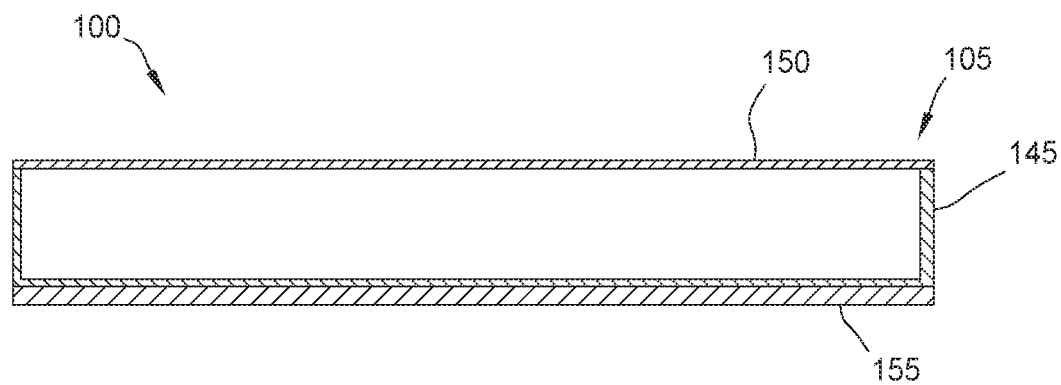
FIG. 3 is a schematic side profile view of the tape drive illustrated in FIG. 1, according to one implementation.

FIG. 3 is a schematic side profile view of the tape drive 100 illustrated in FIG. 1, according to one implementation.

Focusing on FIG. 2, for example, the tape drive 100 includes an enclosure that includes a casing 105, one or more tape reels 110, one or more rotors (e.g., a stepping motor 120 (also known as a stepper motor), a voice coil motor (VCM) 125, a head assembly 130 with one or more read heads and one or more write heads, and tape guides/rollers 135a, 135b. Focusing on FIG. 3, for example, the tape drive 100 also includes a printed circuit board assembly 155 (PCBA). In one embodiment, which can be combined with other embodiments, most of the components are within an interior cavity of the casing 105, except the PCBA 155, which is mounted on an external surface of the casing 105. The same components are illustrated in a perspective view in FIG. 1.

In the illustrated implementations, two tape reels 110 are placed in the interior cavity of the casing 105, with a center of each of the two tape reels 110 on the same level in the cavity. As shown in FIGS. 1 and 2, the head assembly 130 is located between and below the two tape reels 110. Tape reel motors located in the spindles of the tape reels 110 can operate to wind and unwind the tape media 115 into and out of the tape reels 110. Each tape reel 110 may also incorporate a tape folder to help the tape media 115 be neatly wound onto the respective tape reel 110. The tape media 115 may be made via a sputtering process to provide improved areal density. The tape media 115 includes two surfaces, an oxide side and a substrate side. The oxide side is the surface that can be magnetically manipulated (written to or read from) by one or more read/write heads. The substrate side of the tape media 115 aids in the strength and flexibility of the tape media 115.

Tape media 115 from the tape reels 110 are biased against the guides/rollers 135a, 135b (collectively referred to as guides/rollers 135) and are movably passed along the head assembly 130 by movement of the reels. The illustrated embodiment shows four guides/rollers 135a, 135b, with the two guides/rollers 135a furthest away from the head assembly 130 serving to change direction of the tape media 115 and the two guides/rollers 135b closest to the head assembly 130 by pressing the tape media 115 against the head assembly 130.

In one embodiment, which can be combined with other embodiments, the guides/rollers 135 utilize the same structure, as shown in FIG. 1. In one embodiment, which can be combined with other embodiments, the guides/rollers 135 may have more specialized shapes and differ from each other based on function, as shown in FIG. 2. A lesser or a greater number of rollers may be used. For example, the two function rollers may be cylindrical in shape, while the two functional guides may be flat-sided (e.g., rectangular prism) or clip shaped with two prongs and the film moving between the prongs of the clip.

The voice coil motor 125 and the stepping motor 120 may variably position the tape head(s) transversely with respect to the width of the recording tape (e.g., the tape media 115). The stepping motor 120 may provide coarse movement, while the voice coil motor 125 may provide finer actuation of the head(s) of the head assembly 130. In one embodiment, which can be combined with other embodiments, servo data may be written to the tape media 115 to aid in more accurate position of the head(s) along the tape media 115.

The casing 105 includes one or more particle filters 141 and/or desiccants 142, as illustrated in FIG. 1, to help maintain the environment in the casing 105. For example, if the casing 105 is not airtight, the particle filters 141 may be placed where airflow is expected. The particle filters 141 and/or desiccants 142 may be placed in one or more of the corners or any other convenient place away from the moving internal components. For example, the moving tape reels 110 may generate internal airflow as the tape media 115 winds/unwinds, and the particle filters 141 may be placed within that airflow.

There is a wide variety of possible placements of the internal components of the tape drive 100 within the casing 105. In particular, as the head assembly 130 is internal to the casing 105 in certain examples, the tape media 115 may not be exposed to the outside of the casing 105. Thus, the tape media 115 does not need to be routed along the edge of the casing 105 and can be freely routed in more compact and/or otherwise more efficient ways within the casing 105. Similarly, the head(s) and tape reels 110 may be placed in a variety of locations to achieve a more efficient layout, as there are no design requirements to provide external access to these components.

As illustrated in FIG. 3, the casing 105 includes a cover 150 and a base 145. The PCBA 155 is attached to the bottom, on an external surface of the casing 105, opposite the cover 150. The base 145 includes three walls and the cover 150 includes a fourth wall to form four walls of a plurality of walls of the casing 105 that is included in the enclosure of the tape drive 100. As the PCBA 155 is made of solid state electronics, environmental issues are less of a concern, so it does not need to be placed inside the casing 105. That leaves room inside the casing 105 for other components, particularly, the moving components and the tape media 115 that would benefit from a more protected environment.

In one embodiment, which can be combined with other embodiments, the tape drive 100 is sealed. Sealing can mean the tape drive 100 is hermetically sealed or simply enclosed without necessarily being airtight. Sealing the drive may be beneficial for tape film winding stability, tape film reliability, and tape head reliability. Desiccant may be used to limit humidity inside the casing 105.

In one embodiment, which can be combined with other embodiments, the cover 150 is used to hermetically seal the tape drive 100. For example, the tape drive 100 may be hermetically sealed for environmental control by attaching (e.g., laser welding, adhering using adhesive, etc.) the cover 150 to the base 145. The tape drive 100 may be filled by helium, nitrogen, hydrogen, or any other typically inert gas.

In one embodiment, which can be combined with other embodiments, other components may be added to the tape drive 100. For example, a pre-amp for the heads of the head assembly 130 may be added to the tape drive 100. The pre-amp may be located on the PCBA 155, in the head assembly 130, or in another location. In general, placing the pre-amp closer to the heads may have a greater effect on the read and write signals in terms of signal-to-noise ratio (SNR). In one embodiment, which can be combined with other embodiments, some of the components may be omitted. For example, the particle filters 141 and/or the desiccant 142 may be omitted.

Figure 4A:
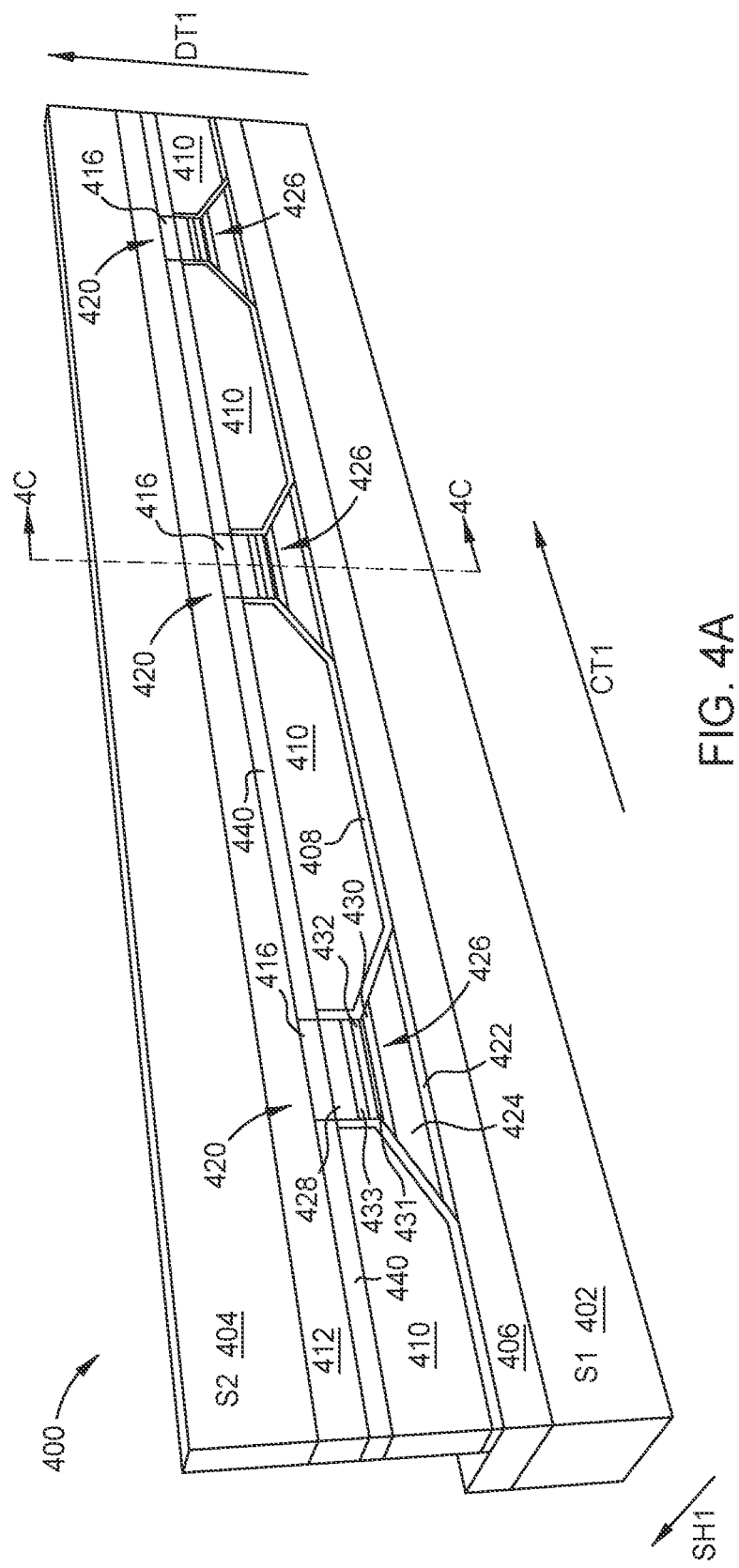
FIGS. 4A-4C illustrate schematic views of a read head, according to one implementation.
Figure 4C:
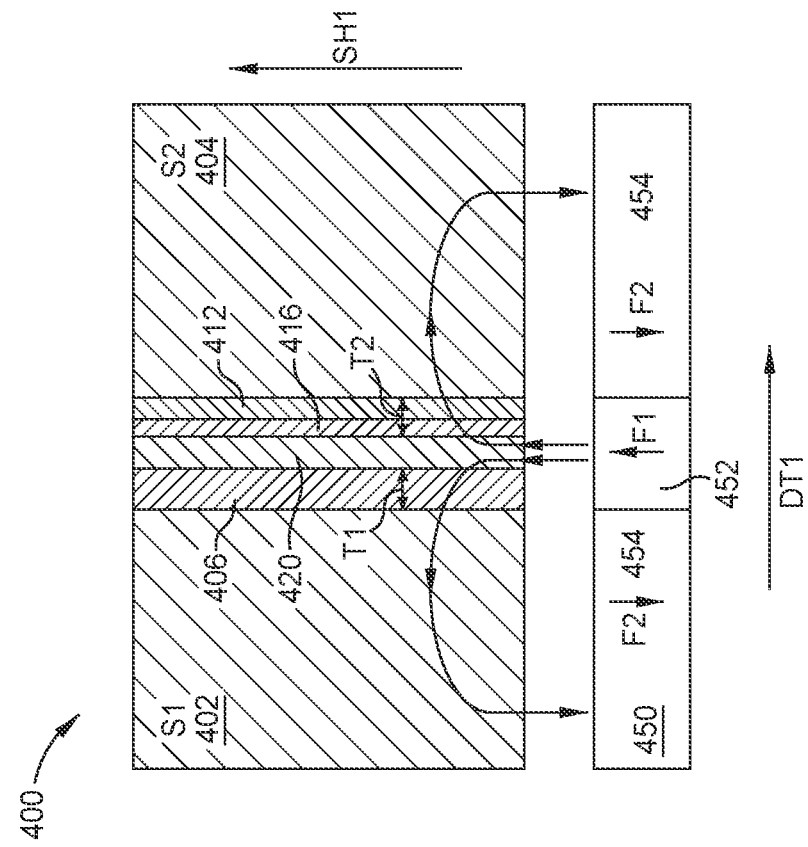
Figure 4B:
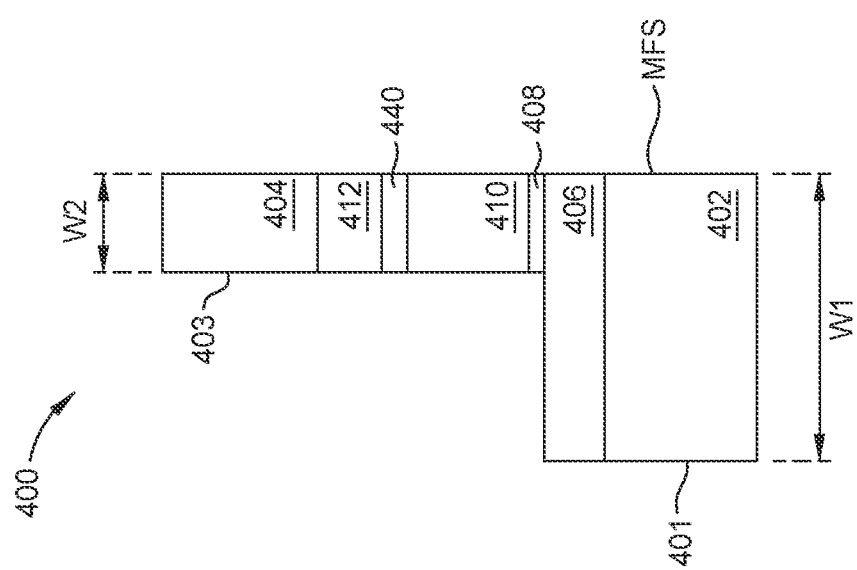

FIGS. 4A-4C illustrate schematic views of a read head 400, according to one implementation. FIG. 4A is a schematic isometric media facing surface (MFS) view of a read head 400, according to one implementation. The read head 400 can be used as part of the tape drive 100 (a magnetic storage device) shown in FIG. 1. The read head 400 comprises a lower shield (S1) 402, an upper shield (S2) 404, and a plurality of read sensors 420 disposed between the lower shield 402 and the upper shield 404. While three read sensors 420 are shown in FIG. 4A, the read head 400 may comprise any number of read sensors 420, and the number of read sensors 420 is not intended to be limiting.

A lower lead 406 is disposed between the lower shield 402 and the plurality of read sensors 420. As shown in FIG. 4A, the lower lead 406 is common to each read sensor 420. However, in some embodiments, each read sensor 420 may have a separate lower lead 406 (not shown). The read head 400 comprises a plurality of upper leads 416 disposed above each of the plurality of read sensors 420 in a down-track direction (DT1). A first insulation layer 412 is disposed between the upper shield 404 and the plurality of upper leads 416. A second insulation layer 408 is disposed on the lower lead 406 and surrounding each of the read sensors 420 in the down-track direction. The first insulation layer 412 and the second insulation layer 408 may comprise the same material or a different material.

Each read sensor 420 of the plurality of read sensors 420 includes a multilayer structure. The multilayer structure of each read sensor 420 includes a buffer layer 422 disposed on the lower lead 406, an antiferromagnetic (AFM) layer 424 disposed on the buffer layer 422, and a free layer 426 disposed on the AFM layer 424. Each read sensor 420 includes a cap layer 428 disposed on the free layer 426. The buffer layer 422 is disposed between the respective AFM layer 424 and the lower lead 406. The buffer layer 422 is substantially aligned with a portion of the second insulation layer 408 in a cross-track direction (CT1). The cap layer 428 is non-ferromagnetic. Each layer 422, 424, 426, 428 of each read sensor 420 has length in the cross-track direction less than a length in the cross-track direction of the lower shield 402.

The read head 400 includes a plurality of soft bias side shields 410 disposed between and outwardly of the plurality of read sensors 420, between the first insulation layer 412 and the second insulation layer 408. Each of the soft bias side shields 410 is magnetic, conductive, and has a low coercivity. The soft bias side shields 410 facilitate biasing the magnetic read field of the read sensors 420 during magnetic reading operations. The soft bias side shields 410 facilitate a magnetic field in the cross-track direction (CT1) during the magnetic reading operations. A third insulation layer 440 is disposed outwardly of the plurality of upper leads 416 between the first insulation layer 412 and the soft bias side shields 410. The first insulation layer 412 and the third insulation layer 440 may comprise the same material or a different material.

The free layer 426 of each read sensor 420 includes a plurality of layers 430-433. The free layer 426 is ferromagnetic. The free layer 426 includes two layers, a first layer 430 and a second layer 432, separated by a spacer layer 431. Each of the two layers 430, 432 is formed of one or more of cobalt (Co), iron (Fe), and/or boron (B). The spacer layer 431 is formed of magnesium oxide (MgO) and is of a length along the down-track direction DT1 that is within a range of about 5 Angstroms to about 200 Angstroms, such as about 20 Angstroms. A barrier layer 433 of the free layer is disposed between the second layer 432 and the upper lead 416.

FIG. 4B is a schematic isometric side cross-sectional view of the read head 400 shown in FIG. 4A, according to one implementation. As shown in FIG. 4B, the lower shield 402 and the lower lead 406 each have a first width W1 in the stripe height direction (SH1) from the MFS to a first surface 401 opposite the MFS. The second insulation layer 408, the soft bias side shields 410, the read sensors 420, the third insulation layer 440, the first insulation layer 412, and the upper shields 404 each have a second width W2 the stripe height direction from the MFS to a second surface 403 opposite the MFS. The first width W1 is greater than the second width W2. In other words, the first surface 401 and the second surface 403 are not aligned.

During formation of the read head 400, the lower shield 402, the lower lead 406, and the read sensors 420 are first deposited. A first photoresist (not shown) is deposited over portions of the read sensors 420 having the second length L2, and the remaining portions of the read sensor 420 uncovered by the first photoresist are milled away and removed. The second insulation layer 408 and the soft bias side shields 410 are then deposited and the first photoresist is removed. The upper leads 416 and third insulation layer 440 are then deposited and formed, followed by the first insulation layer 412 and the upper shields 404 being deposited. A second photoresist (not shown) is deposited over the portions of the upper shields 404 having the second width W2, and the remaining portions of the second insulation layer 408, the soft bias side shields 410, the read sensors 420, the third insulation layer 440, the first insulation layer 412, and the upper shields 404 are then milled away and removed. Upon milling the portions of the second insulation layer 408, the soft bias side shields 410, the read sensors 420, the third insulation layer 440, the first insulation layer 412, and the upper shields 404 uncovered by the second photoresist, an insulation layer (not shown) is deposited to fill the removed portion, and the second photoresist is removed.

FIG. 4C is a schematic cross-sectional view, along Section 4C-4C, of the read head 400 shown in FIG. 4A, according to one implementation. The general cross-sectional view shown in FIG. 4C is applicable to the read heads 500-900 of FIGS. 5A-9. The lower lead 406 between the lower shield 402 and the soft bias side shields 410 has a first thickness T1. The first insulation layer 412 and the upper lead 416 between the upper shield 404 and soft bias side shields 410 collectively have a second thickness T2. The second thickness T2 is substantially equal to the first thickness T1 such that a difference between the second thickness T2 and the first thickness T1 is about 50 nm or less.

The second thickness T2 being substantially equal to the first thickness T1 facilitates stabilizing the read sensors 420, stabilizing of the soft bias shields 410, and enhancing magnetic reading operations while minimizing signal shunting. In addition to the first thickness T1 and the second thickness T2 being substantially equal, the soft bias shields 410 having the second width W2 in the stripe height direction less than the first width W1 further stabilizes the soft bias shields 410 through shape anisotropy. The shape, and resulting shape anisotropy, of the soft bias shields 410 pins the magnetization of the soft bias shields 410 in a desired direction, such as in the cross-track direction.

During magnetic reading operations, a tape media 450 moves past the read sensors 420 in the down-track direction DT1. A portion 452 of the tape media 450 aligned with the read sensor 420 along the stripe height direction SH1 undergoes a first magnetic force F1. Portions 454 of the tape media 450 aligned outside of the read sensor 420 along the stripe height direction SH1 undergoes second magnetic forces F2 that oppose or is the same direction as the first magnetic force F1.

FIGS. 5A-5B illustrate schematic views of a read head 500, according to another implementation. FIG. 5A is a schematic isometric MFS view of a read head 500, according to one implementation. The read head 500 can be used as part of the tape drive 100 (a magnetic storage device) shown in FIG. 1. The read head 500 of FIGS. 5A-5B is similar to the read head 400 of FIGS. 4A-4C. As such, similar reference numerals are used in FIGS. 4A-4C and FIGS. 5A-5B for aspects that are the same in each read head 400, 500.

While three read sensors 520 are shown in FIGS. 5A-5B, the read head 500 may comprise any number of read sensors 520, and the number of read sensors 520 is not intended to be limiting. Furthermore, as shown in FIGS. 5A-5B, the lower lead 406 is common to each read sensor 520. However, in some embodiments, each read sensor 520 may have a separate lower lead 406 (not shown).

Each read sensor 520 of the plurality of read sensors 520 includes a multilayer structure. The multilayer structure of each read sensor 520 includes a buffer layer 422 disposed on the lower lead 406, an AFM layer 424 disposed on the buffer layer 422, and a free layer 526 disposed on the AFM layer 424. Each read sensor 420 includes a cap layer 428 disposed on the free layer 526. The buffer layer 422 is disposed between the respective AFM layer 424 and the lower lead 406. The cap layer 428 is non-ferromagnetic. The buffer layer 422 and the AFM layer 424 are common to each sensor 520. Stated otherwise, each sensor 520 comprises a portion of the buffer layer 422 and a portion of the AFM layer 424 such that the collective portions of the buffer layer 422 and the collective portions of the AFM layer 424 span the plurality of read sensors 520.

The free layer 526 of each read sensor 520 includes a plurality of layers 430-433. The free layer 526 is ferromagnetic. The free layer 526 includes the two layers, the first layer 430 and the second layer 432, separated by the spacer layer 431. The barrier layer 433 of the free layer 526 is disposed between the second layer 432 and the upper lead 416. The read head 500 varies from the read head 400 in that each free layer 526 of each read sensor 520 shares a common first layer 430, while each read sensor 520 has its own individual spacer layer 431, second layer 432, and barrier layer 433. Stated otherwise, each sensor 520 comprises a portion of the first layer 430 such that the collective portions of the first layer 430 span the plurality of read sensors 520 Additionally, the buffer layer 422 and the AFM layer 424 have a same length in the cross-track direction and a same width (i.e., W1) in the stripe height direction as the lower shield 402. The second insulation layer 408 is disposed on the first layer 430 of the free layer 526 and surrounding each of the read sensors 520 in the down-track direction.

The read head 500 includes a plurality of soft bias side shields 410 disposed between and outwardly of the spacer layer 431, the second layer 432, the barrier layer 433, and the cap layer 428 of each of the read sensors 420, between the first insulation layer 412 and the second insulation layer 408. Each of the soft bias side shields 410 is magnetic, conductive, and has a low coercivity. The soft bias side shields 410 facilitate biasing the magnetic read field of the read sensors 520 during magnetic reading operations. The soft bias side shields 410 facilitate a magnetic field in the cross-track direction during the magnetic reading operations. A third insulation layer 440 is disposed outwardly of the plurality of upper leads 416 between the first insulation layer 412 and the soft bias side shields 410. The third insulation layer 440 has the second width W2 in the stripe height direction. The first insulation layer 412 and the third insulation layer 440 may comprise the same material or a different material.

As discussed and shown above in FIG. 4C, the lower lead 406 between the lower shield 402 and the soft bias side shields 410 has a first thickness T1. The first insulation layer 412 and the upper lead 416 between the upper shield 404 and soft bias side shields 410 collectively have a second thickness T2. The second thickness T2 is substantially equal to the first thickness T1 such that a difference between the second thickness T2 and the first thickness T1 is about 50 nm or less. The second thickness T2 being substantially equal to the first thickness T1 facilitates stabilizing the read sensors 520, stabilizing of the soft bias shields 410, and enhancing magnetic reading operations while minimizing signal shunting. In addition to the first thickness T1 and the second thickness T2 being substantially equal, the soft bias shields 410 having the second width W2 in the stripe height direction less than the first width W1 further stabilizes the soft bias shields 410 through shape anisotropy. The shape, and resulting shape anisotropy, of the soft bias shields 410 pins the magnetization of the soft bias shields 410 in a desired direction, such as in the cross-track direction.

The lower shield 402, the lower lead 406, the buffer layer 422, the AFM layer 424, the first layer 430 of the free layer 526, the first insulation layer 412, the second insulation layer 408, the third insulation layer 440, and the upper shield 404 each have a first length L1 in the cross-track direction. The spacer layer 431 of the free layer 526, the second layer 432 of the free layer 526, the barrier layer 433 of the free layer 526, the cap layer 428, and the upper lead 416 each have a second length L2 in the cross-track direction. The second length L2 is less than the first length L1.

FIG. 5B is a schematic isometric side cross-sectional view of the read head 500 shown in FIG. 5A, according to one implementation. As shown in FIG. 5B, the lower shield 402, the lower lead 406, the buffer layer 422, the AFM layer 424, and the first layer 430 of the free layer 526 each have a first width W1 the stripe height direction from the MFS to a first surface 401 opposite the MFS. The second insulation layer 408, the soft bias side shields 410, the spacer layer 431 of the free layer 526, the second layer 432 of the free layer 526, the barrier layer 433 of the free layer 526, the cap layer 428, the third insulation layer 440, the first insulation layer 412, the upper lead 416, and the upper shield 404 each have a second width W2 the stripe height direction from the MFS to a second surface 403 opposite the MFS. The first width W1 is greater than the second width W2. In other words, the first surface 401 and the second surface 403 are not aligned.

During formation of the read head 500, the lower shield 402, the lower lead 406, and the read sensors 520 are first deposited. A first photoresist (not shown) is deposited over portions of the read sensors 520 having the second length L2, and the remaining or exposed portions of the cap layer 428, the barrier layer 433 of the free layer 526, the second layer 432 of the free layer 526, the spacer layer 431 of the free layer 526 are then milled away and removed. The second insulation layer 408 and the soft bias side shields 410 are then deposited and the first photoresist is removed. The upper leads 416 and third insulation layer 440 are deposited and formed, followed by the first insulation layer 412 and the upper shields 404 being deposited.

A second photoresist (not shown) is deposited over the portions of the upper shield 404 having the third width W2, and the remaining or exposed portions of the second insulation layer 408, the soft bias side shields 410, the spacer layer 431 of the free layer 526, the second layer 432 of the free layer 526, the barrier layer 433 of the free layer 526, the cap layer 428, the first insulation layer 412, the upper lead 416, the third insulation layer 440, and the upper shield 404 are milled away and removed. Upon milling the portions of the second insulation layer 408, the soft bias side shields 410, the spacer layer 431 of the free layer 526, the second layer 432 of the free layer 526, the barrier layer 433 of the free layer 526, the cap layer 428, the first insulation layer 412, the upper lead 416, the third insulation layer 440, and the upper shield 404 uncovered by the second photoresist, an insulation layer (not shown) is deposited to fill the removed portions, and the second photoresist is removed.

Figure 6:
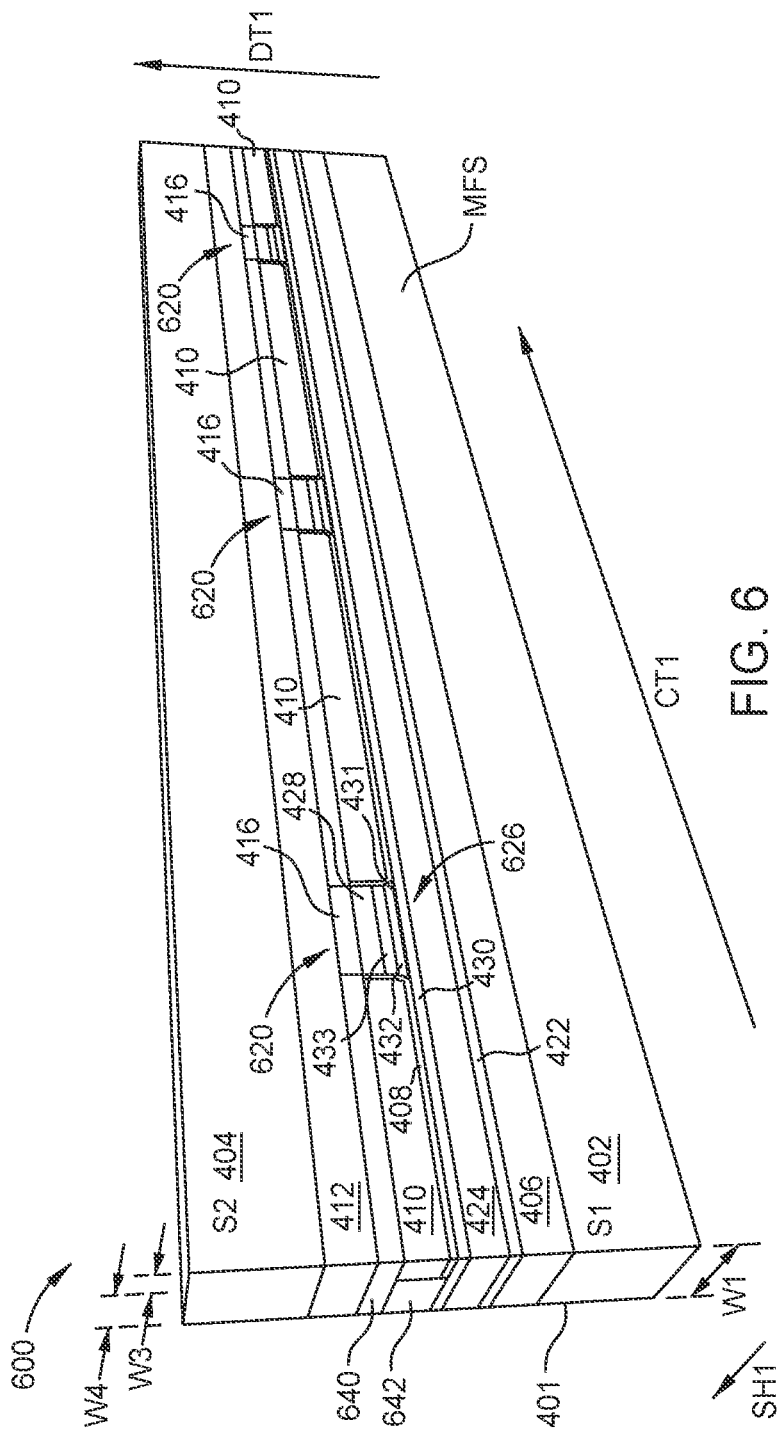
FIG. 6-9 illustrates various embodiments of read heads, according to various implementations.

FIG. 6 is a schematic isometric MFS view of a read head 600, according to another implementation. The read head 600 can be used as part of the tape drive 100 (a magnetic storage device) shown in FIG. 1. The read head 600 of FIG. 6 is similar to the read head 400 of FIGS. 4A-4C and to the read head 500 of FIGS. 5A-5B. As such, similar reference numerals are used in FIGS. 4A-4C, FIGS. 5A-5B, and FIG. 6 for aspects that are the same in each read head 400, 500, 600.

While two read sensors 620 are shown in FIG. 6, the read head 600 may comprise any number of read sensors 620, and the number of read sensors 620 is not intended to be limiting. Furthermore, as shown in FIG. 6, the lower lead 406 is common to each read sensor 620. However, in some embodiments, each read sensor 620 may have a separate lower lead 406 (not shown).

Each read sensor 620 of the plurality of read sensors 620 includes a multilayer structure. The multilayer structure of each read sensor 620 includes a buffer layer 422 disposed on the lower lead 406, an AFM layer 424 disposed on the buffer layer 422, and a free layer 626 disposed on the AFM layer 424. Each read sensor 420 includes a cap layer 428 disposed on the free layer 626. The buffer layer 422 is disposed between the respective AFM layer 424 and the lower lead 406. The cap layer 428 is non-ferromagnetic. The buffer layer 422 and the AFM layer 424 are common to each sensor 620. Stated otherwise, each sensor 620 comprises a portion of the buffer layer 422 and a portion of the AFM layer 424 such that the collective portions of the buffer layer 422 and the collective portions of the AFM layer 424 span the plurality of read sensors 620.

The free layer 626 of each read sensor 620 includes a plurality of layers 430-433. The free layer 626 is ferromagnetic. The free layer 626 includes the two layers, the first layer 430 and the second layer 432, separated by the spacer layer 431. The barrier layer 433 of the free layer 626 is disposed between the second layer 432 and the upper lead 416. The read head 600 varies from the read head 400 in that each free layer 626 of each read sensor 620 shares a common first layer 430, while each read sensor 620 has its own individual spacer layer 431, second layer 432, and barrier layer 433. Stated otherwise, each sensor 620 comprises a portion of the first layer 430 such that the collective portions of the first layer 430 span the plurality of read sensors 620 Additionally, the buffer layer 422 and the AFM layer 424 have a same length in the cross-track direction and a same width (i.e., W1) in the stripe height direction as the lower shield 402, and the buffer layer 422 and the AFM 424 are common to each sensor 620. The second insulation layer 408 is disposed on the first layer 430 of the free layer 626 and surrounding each of the read sensors 620 in the down-track direction.

The read head 600 includes a plurality of soft bias side shields 410 disposed between and outwardly of the spacer layer 431, the second layer 432, the barrier layer 433, and the cap layer 428 of each of the read sensors 620, between the first insulation layer 412 and the second insulation layer 408. Each of the soft bias side shields 410 is magnetic, conductive, and has a low coercivity. The soft bias side shields 410 facilitate biasing the magnetic read field of the read sensors 620 during magnetic reading operations. The soft bias side shields 410 facilitate a magnetic field in the cross-track direction during the magnetic reading operations.

The read head 600 varies from the read head 500 in that a third insulation layer 640 is disposed between the first insulation layer 412 and the plurality of soft bias side shields 410 adjacent to the upper leads 416. The third insulation layer 640 may comprise the same material as the first insulation layer 412 or a different material. Additionally, each of the plurality of soft bias side shields 410, each of the sensors 620, and the second insulation layer 408 have a third width W3 the stripe height direction extending from the MFS towards a surface 401 opposite the MFS. A fourth insulation layer 642 is disposed behind each of the plurality of soft bias side shields 410, each sensor 620, and the second insulation layer 408 between the third insulation layer 640 and the first layer 430. The fourth insulation layer 642 may comprise the same material as the first insulation layer 412 or a different material.

The fourth insulation layer 642 has a fourth width W4 the stripe height direction extending from the plurality of soft bias side shields 410, each sensor 620, and the second insulation layer 408 to the surface 401 opposite the MFS. The lower shield 402, the lower lead 406, the buffer layer 422, the AFM layer 424, the first layer 430, the third insulation layer 640, the first insulation layer 412, and the upper shield 404 each have a first width W1 the stripe height direction greater than the third width W3. The third width W3 and the fourth width W4 collectively equal the first width W1.

As discussed and shown above in FIG. 4C, the lower lead 406 between the lower shield 402 and the soft bias side shields 410 has a first thickness T1. The first insulation layer 412 and the upper lead 416 between the upper shield 404 and soft bias side shields 410 collectively have a second thickness T2. The second thickness T2 is substantially equal to the first thickness T1 such that a difference between the second thickness T2 and the first thickness T1 is about 50 nm or less. The second thickness T2 being substantially equal to the first thickness T1 facilitates stabilizing the read sensors 420, stabilizing of the soft bias shields 410, and enhancing magnetic reading operations while minimizing signal shunting. In addition to the first thickness T1 and the second thickness T2 being substantially equal, the soft bias shields 410 having the third width W3 in the stripe height direction less than the first width W1 further stabilizes the soft bias shields 410 through shape anisotropy. The shape, and resulting shape anisotropy, of the soft bias shields 410 pins the magnetization of the soft bias shields 410 in a desired direction, such as in the cross-track direction.

During formation of the read head 600, the lower shield 402, the lower lead 406, and the read sensors 620 are first deposited. A first photoresist (not shown) is deposited over portions of the read sensors 620 having the second length L2, and the remaining or exposed portions of the cap layer 428, the barrier layer 433 of the free layer 626, the second layer 432 of the free layer 626, the spacer layer 431 of the free layer 626 are milled away and removed. The second insulation layer 408 and the soft bias side shields 410 are then deposited and the first photoresist is removed. A second photoresist (not shown) is deposited over the portions of the second insulation layer 408, the soft bias side shields 410, the spacer layer 431 of the free layer 626, the second layer 432 of the free layer 626, and the barrier layer 433 of the free layer 626 having the third width W3, and the remaining portions of the second insulation layer 408, the soft bias side shields 410, the spacer layer 431 of the free layer 626, the second layer 432 of the free layer 626, and the barrier layer 433 of the free layer 626 are then milled away and removed.

Upon milling the portions of the second insulation layer 408, the soft bias side shields 410, the spacer layer 431 of the free layer 626, the second layer 432 of the free layer 626, and the barrier layer 433 of the free layer 626 uncovered by the second photoresist, the fourth insulation layer 642 is deposited and the second photoresist is removed. The third insulation layer 640, the first insulation layer 412, the upper leads 416, and the upper shield 404 are then deposited and formed over the fourth insulation layer 642 and the sensors 620.

Figure 7:
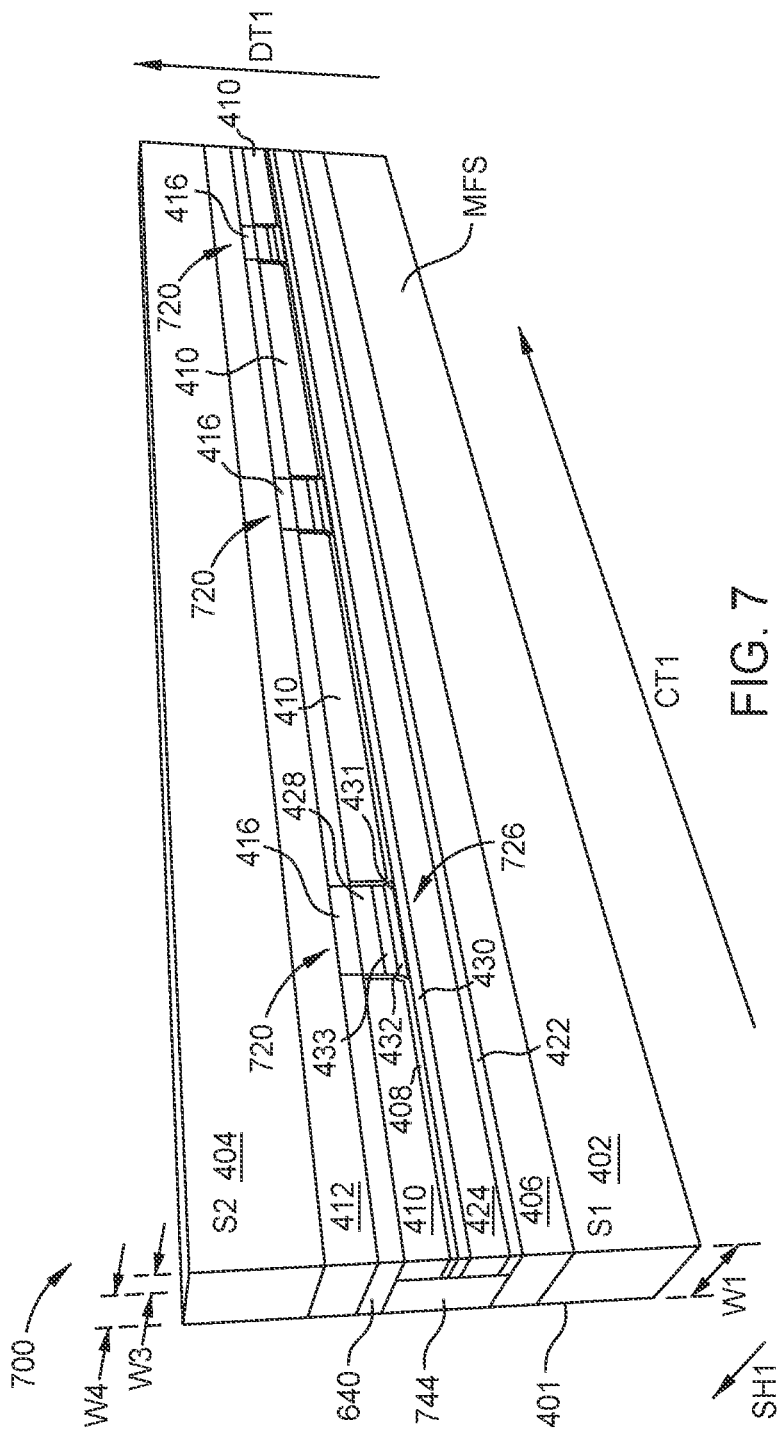

FIG. 7 is a schematic isometric MFS view of a read head 700, according to one implementation. The read head 700 can be used as part of the tape drive 100 (a magnetic storage device) shown in FIG. 1. The read head 700 of FIG. 7 is similar to the read head 400 of FIGS. 4A-4C, the read head 500 of FIGS. 5A-5B, and the read head 600 of FIG. 6. As such, similar reference numerals are used in FIGS. 4A-4C, FIGS. 5A-5B, FIG. 6, and FIG. 7 for aspects that are the same in each read head 400, 500, 600, 700.

While two read sensors 720 are shown in FIG. 7, the read head 700 may comprise any number of read sensors 720, and the number of read sensors 720 is not intended to be limiting. Furthermore, as shown in FIG. 7, the lower lead 406 is common to each read sensor 720. However, in some embodiments, each read sensor 720 may have a separate lower lead 406 (not shown).

Each read sensor 720 of the plurality of read sensors 720 includes a multilayer structure. The multilayer structure of each read sensor 720 includes a buffer layer 422 disposed on the lower lead 406, an AFM layer 424 disposed on the buffer layer 422, and a free layer 726 disposed on the AFM layer 424. Each read sensor 420 includes a cap layer 428 disposed on the free layer 726. The buffer layer 422 is disposed between the respective AFM layer 424 and the lower lead 406. The cap layer 428 is non-ferromagnetic. The buffer layer 422 and the AFM layer 424 are common to each sensor 720. Stated otherwise, each sensor 720 comprises a portion of the buffer layer 422 and a portion of the AFM layer 424 such that the collective portions of the buffer layer 422 and the collective portions of the AFM layer 424 span the plurality of read sensors 720.

The free layer 726 of each read sensor 720 includes a plurality of layers 430-433. The free layer 726 is ferromagnetic. The free layer 726 includes the two layers, the first layer 430 and the second layer 432, separated by the spacer layer 431. The barrier layer 433 of the free layer 726 is disposed between the second layer 432 and the upper lead 416. The read head 700 varies from the read head 400 in that each free layer 726 of each read sensor 720 shares a common first layer 430, while each read sensor 720 has its own individual spacer layer 431, second layer 432, and barrier layer 433. Stated otherwise, each sensor 720 comprises a portion of the first layer 430 such that the collective portions of the first layer 430 span the plurality of read sensors 720. Additionally, the buffer layer 422 and the AFM layer 424 have a same length in the cross-track direction as the lower shield 402, and the buffer layer 422 and the AFM layer 424 are common to each sensor 720. The second insulation layer 408 is disposed on the first layer 430 of the free layer 726 and surrounding each of the read sensors 720 in the down-track direction.

The read head 700 includes a plurality of soft bias side shields 410 disposed between and outwardly of the spacer layer 431, the second layer 432, the barrier layer 433, and the cap layer 428 of each of the read sensors 720, between the first insulation layer 412 and the second insulation layer 408. Each of the soft bias side shields 410 is magnetic, conductive, and has a low coercivity. The soft bias side shields 410 facilitate biasing the magnetic read field of the read sensors 720 during magnetic reading operations. The soft bias side shields 410 facilitate a magnetic field in the cross-track direction during the magnetic reading operations.

The read head 700 varies from the read head 600 in that each of the plurality of soft bias side shields 410, each of the sensors 720, the second insulation layer 408, the first layer 430, the AFM layer 424, and the buffer layer 422 have the third width W3 the stripe height direction extending from the MFS towards a surface 401 opposite the MFS. A fifth insulation layer 744 is disposed behind each of the plurality of soft bias side shields 410, each of the sensors 620, the second insulation layer 408, the first layer 430, the AFM layer 424, and the buffer layer 422 between the third insulation layer 640 and the lower lead 406. The fifth insulation layer 744 may comprise the same material as the first insulation layer 412 or a different material. The fifth insulation layer 744 has the fourth width W4 the stripe height direction extending from the plurality of soft bias side shields 410, each of the sensors 620, the second insulation layer 408, the first layer 430, the AFM layer 424, and the buffer layer 422 to the surface 401 opposite the MFS. The lower shield 402, the lower lead 406, the third insulation layer 640, the first insulation layer 412, and the upper shield 404 each have the first width W1 the stripe height direction greater than the third width W3. The third width W3 and the fourth width W4 collectively equal the first width W1.

As discussed and shown above in FIG. 4C, the lower lead 406 between the lower shield 402 and the soft bias side shields 410 has a first thickness T1. The first insulation layer 412 and the upper lead 416 between the upper shield 404 and soft bias side shields 410 collectively have a second thickness T2. The second thickness T2 is substantially equal to the first thickness T1 such that a difference between the second thickness T2 and the first thickness T1 is about 50 nm or less. The second thickness T2 being substantially equal to the first thickness T1 facilitates stabilizing the read sensors 420, stabilizing of the soft bias shields 410, and enhancing magnetic reading operations while minimizing signal shunting. In addition to the first thickness T1 and the second thickness T2 being substantially equal, the soft bias shields 410 having the third width W3 in the stripe height direction less than the first width W1 further stabilizes the soft bias shields 410 through shape anisotropy. The shape, and resulting shape anisotropy, of the soft bias shields 410 pins the magnetization of the soft bias shields 410 in a desired direction, such as in the cross-track direction.

During formation of the read head 700, the lower shield 402, the lower lead 406, and the read sensors 720 are first deposited. A first photoresist (not shown) is deposited over portions of the read sensors 720 having the second length L2, and the remaining or exposed portions of the cap layer 428, the barrier layer 433 of the free layer 726, the second layer 432 of the free layer 726, the spacer layer 431 of the free layer 726 are milled away and removed. The second insulation layer 408 and the soft bias side shields 410 are then deposited and the first photoresist is removed. A second photoresist (not shown) is deposited over the portions of the buffer layer 422, the AFM layer 424, and the first layer 430 of the free layer 726, the second insulation layer 408, the soft bias side shields 410, the spacer layer 431 of the free layer 726, the second layer 432 of the free layer 726, and the barrier layer 433 of the free layer 726 having the third width W3, and the remaining portions of the buffer layer 422, the AFM layer 424, and the first layer 430 of the free layer 726, the second insulation layer 408, the soft bias side shields 410, the spacer layer 431 of the free layer 726, the second layer 432 of the free layer 726, and the barrier layer 433 of the free layer 726 are then milled away and removed.

Upon milling the portions of the buffer layer 422, the AFM layer 424, and the first layer 430 of the free layer 726, the second insulation layer 408, the soft bias side shields 410, the spacer layer 431 of the free layer 726, the second layer 432 of the free layer 726, and the barrier layer 433 of the free layer 726 uncovered by the second photoresist, the fifth insulation layer 744 is deposited and the second photoresist is removed. The third insulation layer 640, the first insulation layer 412, the upper leads 416, and the upper shield 404 are then deposited and formed over the fourth insulation layer 642 and the sensors 720.

Figure 8:
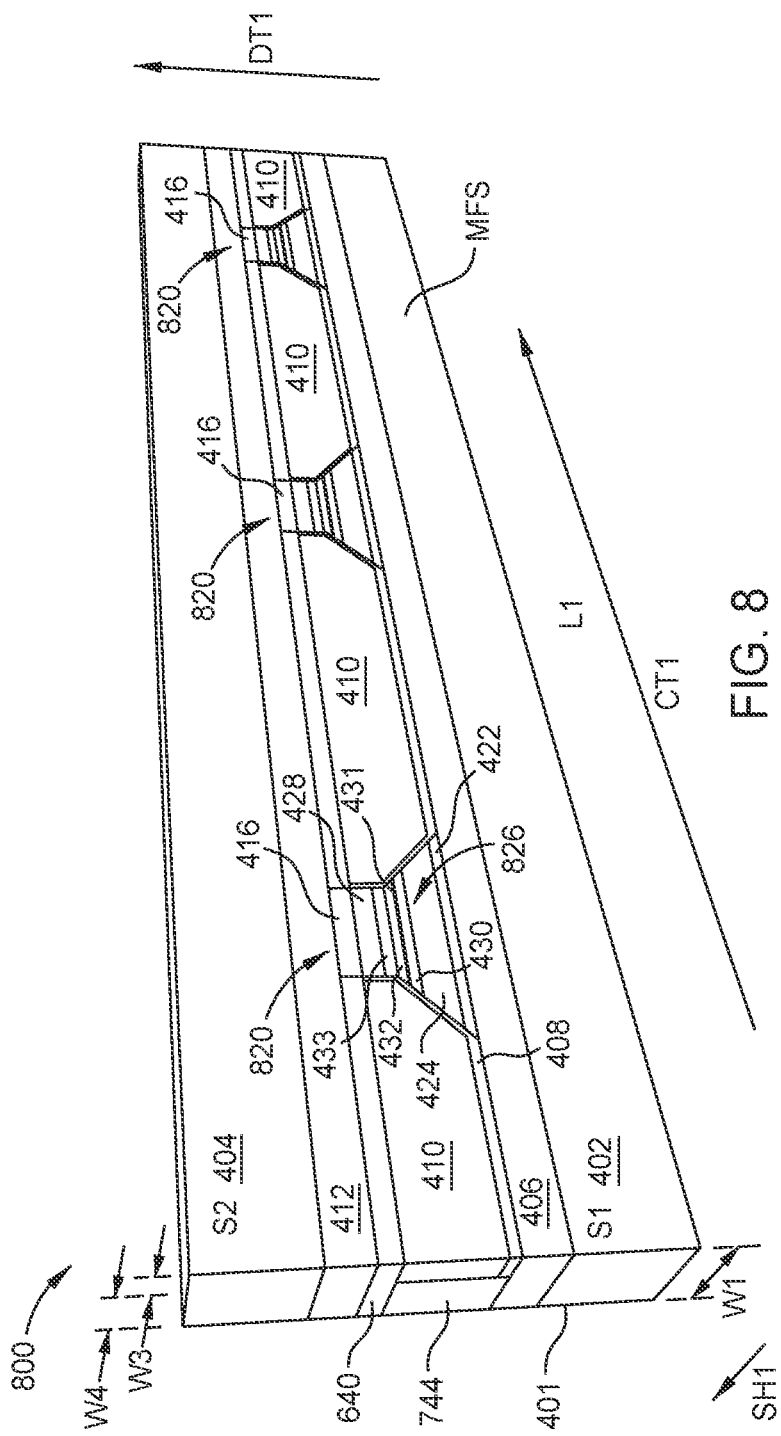

FIG. 8 is a schematic isometric MFS view of a read head 800, according to yet another implementation. The read head 800 can be used as part of the tape drive 100 (a magnetic storage device) shown in FIG. 1. The read head 800 of FIG. 8 is similar to the read head 400 of FIGS. 4A-4C, the read head 500 of FIGS. 5A-5B, the read head 600 of FIG. 6, and the read head 700 of FIG. 7. As such, similar reference numerals are used in FIGS. 4A-4C, FIGS. 5A-5B, FIG. 6, FIG. 7, and FIG. 8 for aspects that are the same in each read head 400, 500, 600, 700, 800.

While two read sensors 820 are shown in FIG. 8, the read head 800 may comprise any number of read sensors 820, and the number of read sensors 820 is not intended to be limiting. Furthermore, as shown in FIG. 8, the lower lead 406 is common to each read sensor 820. However, in some embodiments, each read sensor 820 may have a separate lower lead 406 (not shown).

Each read sensor 820 of the plurality of read sensors 820 includes a multilayer structure. The multilayer structure of each read sensor 820 includes a buffer layer 422 disposed on the lower lead 406, an AFM layer 424 disposed on the buffer layer 422, and a free layer 826 disposed on the AFM layer 424. Each read sensor 420 includes a cap layer 428 disposed on the free layer 826. The buffer layer 422 is disposed between the respective AFM layer 424 and the lower lead 406. The cap layer 428 is non-ferromagnetic.

The read head 800 includes a plurality of soft bias side shields 410 disposed between and outwardly of the plurality of read sensors 820 (i.e., outwardly of the first layer 430, the spacer layer 431, the second layer 432, the barrier layer 433, and the cap layer 428), between the first insulation layer 412 and the second insulation layer 408. Each of the soft bias side shields 410 is magnetic, conductive, and has a low coercivity. The soft bias side shields 410 facilitate biasing the magnetic read field of the read sensors 820 during magnetic reading operations. The soft bias side shields 410 facilitate a magnetic field in the cross-track direction during the magnetic reading operations.

The free layer 826 of each read sensor 820 includes a plurality of layers 430-433. The free layer 826 is ferromagnetic. The free layer 826 includes the two layers, the first layer 430 and the second layer 432, separated by the spacer layer 431. The barrier layer 433 of the free layer 826 is disposed between the second layer 432 and the upper lead 416. The read head 800 is similar to the read head 400 in that each read sensor 820 its own individual buffer layer 422, AFM layer 424, first layer 430, spacer layer 431, second layer 432, and barrier layer 433. The second insulation layer 408 is disposed on the lower lead 406 and surrounding the read sensors 820.

The read head 800 differs from the read head 400, but is similar to the read heads 600 and 700, in that each of the plurality of soft bias side shields 410, each of the sensors 820, and the second insulation layer 408 have the third width W3 the stripe height direction extending from the MFS towards a surface 401 opposite the MFS. The fifth insulation layer 744 is disposed behind each of the plurality of soft bias side shields 410, each sensor 820, and the second insulation layer 408 between the third insulation layer 640 and the lower lead 306. The fifth insulation layer 744 has the fourth width W4 the stripe height direction extending from the plurality of soft bias side shields 410, each sensor 820, and the second insulation layer 408 to the surface 401 opposite the MFS. The lower shield 402, the lower lead 406, the third insulation layer 640, the first insulation layer 412, and the upper shield 404 each have a first width W1 the stripe height direction greater than the third width W3. The third width W3 and the fourth width W4 collectively equal the first width W1.

As discussed and shown above in FIG. 4C, the lower lead 406 between the lower shield 402 and the soft bias side shields 410 has a first thickness T1. The first insulation layer 412 and the upper lead 416 between the upper shield 404 and soft bias side shields 410 collectively have a second thickness T2. The second thickness T2 is substantially equal to the first thickness T1 such that a difference between the second thickness T2 and the first thickness T1 is about 50 nm or less. The second thickness T2 being substantially equal to the first thickness T1 facilitates stabilizing the read sensors 420, stabilizing of the soft bias shields 410, and enhancing magnetic reading operations while minimizing signal shunting. In addition to the first thickness T1 and the second thickness T2 being substantially equal, the soft bias shields 410 having the third width W3 in the stripe height direction less than the first width W1 further stabilizes the soft bias shields 410 through shape anisotropy. The shape, and resulting shape anisotropy, of the soft bias shields 410 pins the magnetization of the soft bias shields 410 in a desired direction, such as in the cross-track direction.

During formation of the read head 800, the lower shield 402, the lower lead 406, and the read sensors 820 are first deposited. The buffer layer 422, the AFM layer 424, and the soft bias side shields 410 are then deposited. A first photoresist (not shown) is deposited over portions of the read sensors 820 having the second length L2, and the remaining or exposed portions of the read sensors 820 are milled away and removed. The second insulation layer 408 and the soft bias side shields 410 are then deposited, and the first photoresist is removed. A second photoresist (not shown) is deposited over the portions of buffer layer 422, the AFM layer 424, the read sensors 820, and the soft bias side shields 410 having the third width W3, and the remaining portions of the second insulation layer 408, the buffer layer 422, the AFM layer 424, the read sensors 820, and the soft bias side shields 410 are then milled away and removed. Upon milling the portions of the second insulation layer 408, the buffer layer 422, the AFM layer 424, the read sensors 820, and the soft bias side shields 410 uncovered by the second photoresist, the fifth insulation layer 744 is deposited and the second photoresist is removed. The third insulation layer 640, the first insulation layer 412, the upper leads 416, and the upper shield 404 are then deposited and formed over the fourth insulation layer 642 and the sensors 820.

Figure 9:
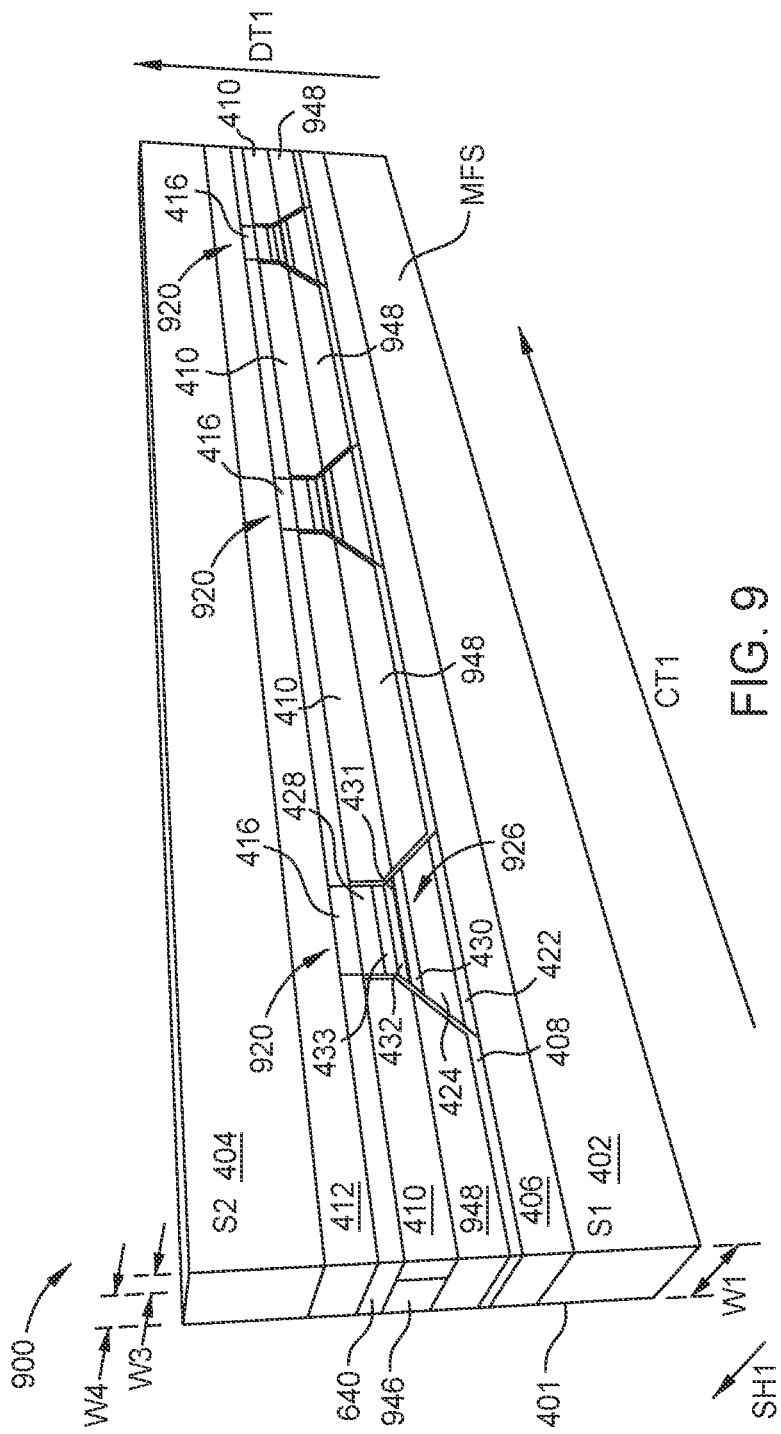

FIG. 9 is a schematic isometric MFS view of a read head 900, according to another implementation. The read head 900 can be used as part of the tape drive 100 (a magnetic storage device) shown in FIG. 1. The read head 900 of FIG. 9 is similar to the read head 400 of FIGS. 4A-4C, the read head 500 of FIGS. 5A-5B, the read head 600 of FIG. 6, the read head 700 of FIG. 7, and the read head 800 of FIG. 8. As such, similar reference numerals are used in FIGS. 4A-4C, FIGS. 5A-5B, FIG. 6, FIG. 7, FIG. 8, and FIG. 9 for aspects that are the same in each read head 400, 500, 600, 700, 800, 900. Moreover, each read head 400, 500, 600, 700, 800, 900 of FIGS. 4A-9 may be used in combination with one another.

While two read sensors 920 are shown in FIG. 9, the read head 900 may comprise any number of read sensors 920, and the number of read sensors 920 is not intended to be limiting. Furthermore, as shown in FIG. 9, the lower lead 406 is common to each read sensor 920. However, in some embodiments, each read sensor 920 may have a separate lower lead 406 (not shown).

Each read sensor 920 of the plurality of read sensors 920 includes a multilayer structure. The multilayer structure of each read sensor 920 includes a buffer layer 422 disposed on the lower lead 406, an AFM layer 424 disposed on the buffer layer 422, and a free layer 926 disposed on the AFM layer 424. Each read sensor 420 includes a cap layer 428 disposed on the free layer 926. The buffer layer 422 is disposed between the respective AFM layer 424 and the lower lead 406. The cap layer 428 is non-ferromagnetic.

The free layer 926 of each read sensor 920 includes a plurality of layers 430-433. The free layer 926 is ferromagnetic. The free layer 926 includes the two layers, the first layer 430 and the second layer 432, separated by the spacer layer 431. The barrier layer 433 of the free layer 926 is disposed between the second layer 432 and the upper lead 416. The read head 900 is similar to the read head 400 and the read head 800 in that each read sensor 920 its own individual buffer layer 422, AFM layer 424, first layer 430, spacer layer 431, second layer 432, and barrier layer 433. The second insulation layer 408 is disposed on the lower lead 406 and surrounding the read sensors 920.

The read head 900 includes a plurality of soft bias side shields 410 disposed between and outwardly of the spacer layer 431, the second layer 432, the barrier layer 433, and the cap layer 428 of each of the read sensors 920, between the third insulation layer 640 and a second buffer layer 948. The second buffer layer 948 is disposed between and outwardly of the first layer 430 and the AFM layer 424 adjacent to the second insulation layer 408. The second buffer layer 948 is nonmagnetic and conductive. Each of the soft bias side shields 410 is magnetic, conductive, and has a low coercivity. The soft bias side shields 410 facilitate biasing the magnetic read field of the read sensors 920 during magnetic reading operations. The soft bias side shields 410 facilitate a magnetic field in the cross-track direction during the magnetic reading operations.

The read head 900 differs from the read head 400, but is similar to the read head 800, in that each of the plurality of soft bias side shields 410, each of the sensors 920, and the second insulation layer 408 have the third width W3 extending from the MFS towards a surface 401 opposite the MFS. A sixth insulation layer 946 is disposed behind each of the plurality of soft bias side shields 410 and the spacer layer 431, the second layer 432, the barrier layer 433, and the cap layer 428 of each sensor 920. The sixth insulation layer 946 is further disposed between the second buffer layer 948 and the third insulation layer 640. The sixth insulation layer 946 may comprise the same material as the first insulation layer 412 or a different material.

The sixth insulation layer 946 has the fourth width W4 the stripe height direction extending from the plurality of soft bias side shields 410, each sensor 920, and the second insulation layer 408 to the surface 401 opposite the MFS. The lower shield 402, the lower lead 406, the third insulation layer 640, the first insulation layer 412, and the upper shield 404 each have a first width W1 greater than the third width W3 the stripe height direction. The third width W3 and the fourth width W4 collectively equal the first width W1.

As discussed and shown above in FIG. 4C, the lower lead 406 between the lower shield 402 and the soft bias side shields 410 has a first thickness T1. The first insulation layer 412 and the upper lead 416 between the upper shield 404 and soft bias side shields 410 collectively have a second thickness T2. The second thickness T2 is substantially equal to the first thickness T1 such that a difference between the second thickness T2 and the first thickness T1 is about 50 nm or less. The second thickness T2 being substantially equal to the first thickness T1 facilitates stabilizing the read sensors 420, stabilizing of the soft bias shields 410, and enhancing magnetic reading operations while minimizing signal shunting. In addition to the first thickness T1 and the second thickness T2 being substantially equal, the soft bias shields 410 having the third width W3 in the stripe height direction less than the first width W1 further stabilizes the soft bias shields 410 through shape anisotropy. The shape, and resulting shape anisotropy, of the soft bias shields 410 pins the magnetization of the soft bias shields 410 in a desired direction, such as in the cross-track direction.

During formation of the read head 900, the lower shield 402, the lower lead 406, and the read sensors 920 are first deposited. A first photoresist (not shown) is deposited over portions of the read sensors 920 having the second length L2, and the remaining or exposed portions of the read sensors 920 are milled away and removed. The second insulation layer 408 and the second buffer layer 948 are then deposited. Portions of the second buffer layer 948 are removed (e.g., milled) along the cross-track direction CT1. The soft bias side shields 410 are then deposited and the first photoresist is removed.

A second photoresist (not shown) is deposited over a portion of the space layer 431 of the free layer 926, the second layer 432 of the free layer 926, the barrier layer 433 of the free layer 926, the cap layer 428, the soft bias shields 410, and the second insulation layer 408, and the remaining or exposed portions of the space layer 431 of the free layer 926, the second layer 432 of the free layer 926, the barrier layer 433 of the free layer 926, the cap layer 428, the soft bias shields 410, and portions of the second insulation layer 408 uncovered by the second photoresist are removed such that the portions of the soft bias shields 410 covered by the second photoresist have the third width W3. The sixth insulation layer 946 is then deposited adjacent to the soft bias shields 410 and the second photoresist is removed. The third insulation layer 640, the first insulation layer 412, the upper leads 416, and the upper shield 404 are then deposited and formed over the sixth insulation layer 946, the soft bias shields 410, and the read sensors 920. Therefore, utilizing self-stabilizing soft bias shields disposed between and outwardly of the plurality of read sensors in read heads facilitates biasing of the magnetic read field of the read sensors during magnetic reading operations. The soft bias shields utilize shape anisotropy to self-stabilize. As such, the soft bias shields enable a magnetic field in the cross-track direction during the magnetic reading operations while minimizing signal shunting, resulting in improved magnetic reading operations in read heads.

In one embodiment, a read head comprises a lower shield having a first width in a stripe height direction, an upper shield, a lower lead disposed over the lower shield, one or more upper leads disposed between the lower lead and the upper shield along a down-track direction, and a plurality of read sensors disposed between the lower lead and the one or more upper leads at a media facing surface, each read sensor of the plurality of read sensors comprising a multilayer structure, the multilayer structure comprising: an antiferromagnetic (AFM) layer and a free layer. The read head further comprises a plurality of soft bias side shields disposed between and outwardly of the plurality of read sensors, each of the plurality of soft bias side shields having a second width in the stripe height direction less than the first width.

Each read sensor of the plurality of read sensors has a third width in the stripe height direction substantially equal to the second width. Each of the plurality of soft bias side shields are spaced a first distance from the lower shield and a second distance from the upper shield, the first distance being substantially equal to the second distance. The free layer comprises a first layer and a second layer. The multilayer structure of each of the plurality of read sensors further comprises: a buffer layer disposed on the lower lead, a barrier layer disposed over the free layer, and a cap layer disposed between the barrier layer and the one or more upper leads. The upper shield has a fourth width in the stripe height direction substantially equal to the second width. A magnetic storage device comprises the read head.

In another embodiment, a read head comprises a lower shield having a first width in a stripe height direction and a first length in a cross-track direction, a lower lead disposed over the lower shield, an AFM layer disposed over the lower lead, the AFM layer having a second length in the cross-track direction substantially equal to the first length, and a plurality of read sensors disposed over the AFM layer at a media facing surface (MFS), each read sensor of the plurality of read sensors comprising a multilayer structure, the multilayer structure comprising: a portion of the AFM layer and a free layer comprising a first layer and a second layer. The read head further comprises a plurality of soft bias side shields disposed between and outwardly of the plurality of read sensors, each of the plurality of soft bias side shields having a second width in the stripe height direction less than the first width, one or more upper leads disposed over the plurality of read sensors, and an upper shield disposed over the one or more upper leads.

The multilayer structure of each of the plurality of read sensors further comprises a buffer layer, and wherein the buffer layer is a part of a common buffer layer spanning the plurality of read sensors and the first layer is part of a common first layer spanning the plurality of read sensors. The first layer has a third length in the cross-track direction substantially equal to the first length. The second layer has a fourth length in the cross-track direction less than the third length. The first layer has a third width in the stripe height direction substantially equal to the first width, and wherein the AFM layer has a fourth width in the stripe height direction substantially equal to the first width. The first layer has a fifth width in the stripe height direction substantially equal to the second width, and wherein the AFM layer has a sixth width in the stripe height direction substantially equal to the second width. The read head further comprises a first insulation layer disposed adjacent to the plurality of soft bias side shields in the stripe height direction, the first insulation layer being recessed from the MFS. A magnetic storage device comprises the read head.

In yet another embodiment, a read head comprises a lower shield having a first width in a stripe height direction, an upper shield, a lower lead disposed over the lower shield, one or more upper leads disposed between the lower lead and the upper shield along a down-track direction, and a plurality of read sensors disposed between the lower lead and the one or more upper leads at a media facing surface, each read sensor of the plurality of read sensors comprising a multilayer structure, the multilayer structure comprising: a buffer layer, an antiferromagnetic (AFM) layer, and a free layer comprising a first layer and a second layer. The read head further comprises a plurality of soft bias side shields disposed between and outwardly of the plurality of read sensors, each of the plurality of soft bias side shields having a second width in the stripe height direction less than the first width. Each of the plurality of soft bias side shields are spaced a first distance from the lower shield and a second distance from the upper shield, the first distance being substantially equal to the second distance.

The AFM layer has a third width in the stripe height direction substantially equal to the second width. The upper shield has a fourth width in the stripe height direction substantially equal to the first width. The AFM layer has a fifth width in the stripe height direction substantially equal to the first width. The upper shield has a sixth width in the stripe height direction substantially equal to the first width. The first layer has a seventh width in the stripe height direction and the second layer has an eighth width in the stripe height direction less than the seventh width. The first layer has a ninth width in the stripe height direction and the second layer has a tenth width in the stripe height direction substantially equal to the ninth width. A magnetic storage device comprises the read head.

While the foregoing is directed to embodiments of the present disclosure, other and further embodiments of the disclosure may be devised without departing from the basic scope thereof, and the scope thereof is determined by the claims that follow.

What is claimed is:

1. A read head, comprising:
    a lower shield having a first width in a stripe height direction;
    an upper shield;
    a lower lead disposed over the lower shield;
    one or more upper leads disposed between the lower lead and the upper shield along a down-track direction;
    a plurality of read sensors disposed between the lower lead and the one or more upper leads at a media facing surface, each read sensor of the plurality of read sensors comprising a multilayer structure, the multilayer structure comprising:
        an antiferromagnetic (AFM) layer; and
        a free layer; and
    a plurality of soft bias side shields disposed between and outwardly of the plurality of read sensors, each of the plurality of soft bias side shields having a second width in the stripe height direction less than the first width, wherein the upper shield has a third width in the stripe height direction substantially equal to the second width.

2. The read head of claim 1, wherein each read sensor of the plurality of read sensors has a fourth width in the stripe height direction substantially equal to the second width.

3. The read head of claim 1, wherein the free layer comprises a first layer and a second layer.

4. A magnetic storage device comprising the read head of claim 1.

5. A read head, comprising:
    a lower shield having a first width in a stripe height direction;
    an upper shield;
    a lower lead disposed over the lower shield;
    one or more upper leads disposed between the lower lead and the upper shield along a down-track direction;
    a plurality of read sensors disposed between the lower lead and the one or more upper leads at a media facing surface, each read sensor of the plurality of read sensors comprising a multilayer structure, the multilayer structure comprising:
        an antiferromaqnetic (AFM) layer;
        a free layer;
        a buffer layer disposed on the lower lead;
        a barrier layer disposed over the free layer; and
        a cap layer disposed between the barrier layer and the one or more upper leads; and
    a plurality of soft bias side shields disposed between and outwardly of the plurality of read sensors, each of the plurality of soft bias side shields having a second width in the stripe height direction less than the first width.

6. A read head, comprising:
    a lower shield having a first width in a stripe height direction;
    an upper shield;
    a lower lead disposed over the lower shield;
    one or more upper leads disposed between the lower lead and the upper shield along a down-track direction;
    a plurality of read sensors disposed between the lower lead and the one or more upper leads at a media facing surface, each read sensor of the plurality of read sensors comprising a multilayer structure, the multilayer structure comprising:
        an antiferromagnetic (AFM) layer; and
        a free layer; and
    a plurality of soft bias side shields disposed between and outwardly of the plurality of read sensors, each of the plurality of soft bias side shields having a second width in the stripe height direction less than the first width, wherein each of the plurality of soft bias side shields are spaced a first distance from the lower shield and a second distance from the upper shield, the first distance being substantially equal to the second distance.

7. A read head, comprising:
    a lower shield having a first width in a stripe height direction and a first length in a cross-track direction;
    a lower lead disposed over the lower shield;
    an antiferromagnetic (AFM) layer disposed over the lower lead, the AFM layer having a second length in the cross-track direction substantially equal to the first length;
    a plurality of read sensors disposed over the AFM layer at a media facing surface (MFS), each read sensor of the plurality of read sensors comprising a multilayer structure, the multilayer structure comprising:
        a portion of the AFM layer; and
        a free layer comprising a first layer and a second layer;
    a plurality of soft bias side shields disposed between and outwardly of the plurality of read sensors, each of the plurality of soft bias side shields having a second width in the stripe height direction less than the first width;
    one or more upper leads disposed over the plurality of read sensors; and
    an upper shield disposed over the one or more upper leads.

8. The read head of claim 7, wherein the multilayer structure of each of the plurality of read sensors further comprises a buffer layer, and wherein the buffer layer is a part of a common buffer layer spanning the plurality of read sensors and the first layer is part of a common first layer spanning the plurality of read sensors.

9. The read head of claim 7, wherein the first layer has a third length in the cross-track direction substantially equal to the first length, and wherein the second layer has a fourth length in the cross-track direction less than the third length.

10. The read head of claim 7, wherein the first layer has a third width in the stripe height direction substantially equal to the first width, and wherein the AFM layer has a fourth width in the stripe height direction substantially equal to the first width.

11. The read head of claim 7, wherein the first layer has a fifth width in the stripe height direction substantially equal to the second width, and wherein the AFM layer has a sixth width in the stripe height direction substantially equal to the second width.

12. The read head of claim 7, further comprising a first insulation layer disposed adjacent to the plurality of soft bias side shields in the stripe height direction, the first insulation layer being recessed from the MFS.

13. A magnetic storage device comprising the read head of claim 7.

14. A read head, comprising:
a lower shield having a first width in a stripe height direction;
an upper shield;
a lower lead disposed over the lower shield;
one or more upper leads disposed between the lower lead and the upper shield along a down-track direction;
a plurality of read sensors disposed between the lower lead and the one or more upper leads at a media facing surface, each read sensor of the plurality of read sensors comprising a multilayer structure, the multilayer structure comprising:
a buffer layer;
an antiferromagnetic (AFM) layer; and
a free layer comprising a first layer and a second layer; and
a plurality of soft bias side shields disposed between and outwardly of the plurality of read sensors, each of the plurality of soft bias side shields having a second width in the stripe height direction less than the first width, wherein each of the plurality of soft bias side shields are spaced a first distance from the lower shield and a second distance from the upper shield, the first distance being substantially equal to the second distance.

15. The read head of claim 14, wherein the AFM layer has a third width in the stripe height direction substantially equal to the second width, and wherein the upper shield has a fourth width in the stripe height direction substantially equal to the first width.

16. The read head of claim 14, wherein the AFM layer has a fifth width in the stripe height direction substantially equal to the first width, and wherein the upper shield has a sixth width in the stripe height direction substantially equal to the first width.

17. The read head of claim 14, wherein the first layer has a seventh width in the stripe height direction and the second layer has an eighth width in the stripe height direction less than the seventh width.

18. The read head of claim 14, wherein the first layer has a ninth width in the stripe height direction and the second layer has a tenth width in the stripe height direction substantially equal to the ninth width.

19. A magnetic storage device comprising the read head of claim 14.

* * * * *